(12) United States Patent
Palaoro et al.

(10) Patent No.: US 8,813,773 B2
(45) Date of Patent: Aug. 26, 2014

(54) VALVE ARRANGEMENT

(75) Inventors: Renato Palaoro, Heidenheim (DE); Ulf Klaiber, Heidenheim (DE); Sven Kindelmann, Syrgenstein (DE); Timo Oppold, Hermaringen (DE); Gerd Haeussler, Giengen (DE)

(73) Assignee: Alligator Ventilfabrik GmbH, Giengen (DE)

( * ) Notice: Subject to any disclaimer, the term of this patent is extended or adjusted under 35 U.S.C. 154(b) by 42 days.

(21) Appl. No.: 13/140,372

(22) PCT Filed: Dec. 16, 2009

(86) PCT No.: PCT/EP2009/009014
§ 371 (c)(1),
(2), (4) Date: Jun. 16, 2011

(87) PCT Pub. No.: WO2010/075967
PCT Pub. Date: Jul. 8, 2010

(65) Prior Publication Data
US 2011/0248204 A1 Oct. 13, 2011

(30) Foreign Application Priority Data

Dec. 17, 2008 (DE) .................. 20 2008 016 621 U
Jun. 2, 2009 (DE) .................. 20 2009 007 703 U

(51) Int. Cl.
*F16K 15/20* (2006.01)
*B60C 23/02* (2006.01)

(52) U.S. Cl.
USPC .................. 137/223; 73/146.5; 73/146.8

(58) Field of Classification Search
USPC .......... 137/223, 557; 73/146.3, 146.4, 146.5, 73/146.8; 152/415
See application file for complete search history.

(56) References Cited

U.S. PATENT DOCUMENTS

| 5,844,131 | A | 12/1998 | Gabelmann et al. |
| 7,017,403 | B2 | 3/2006 | Normann et al. |
| 7,621,177 | B2 * | 11/2009 | Huang et al. .................. 73/146.8 |

(Continued)

FOREIGN PATENT DOCUMENTS

| DE | 102005027002 | 12/2006 |
| DE | 102006043873 | 4/2007 |

(Continued)

OTHER PUBLICATIONS

Canadian Office action dated Sep. 12, 2013.

(Continued)

*Primary Examiner* — John K Fristoe, Jr.
*Assistant Examiner* — Michael R Reid
(74) *Attorney, Agent, or Firm* — Bachman & LaPointe, P.C.

(57) ABSTRACT

A valve device having a valve body (1, 1') releasably connected by a retaining unit (4, 4') to a housing (3, 3') designed for receiving electronic tire pressure measuring device, so that the retaining unit fixes the valve body in a relative position to the housing in a locked state, and the valve body can be displaced in an axial extension direction relative to the housing and released from the same in an unlocked state. The retaining unit is provided on or in the housing, so that it engages laterally in a jacket-side locking segment of the valve body for producing the locked state, and are designed so that the retaining unit is secured or locked on or in the housing in the locked state.

14 Claims, 8 Drawing Sheets

(56) References Cited

U.S. PATENT DOCUMENTS

| | | |
|---|---|---|
| 7,810,390 B2 | 10/2010 | Hettle et al. |
| 8,474,475 B2 | 7/2013 | Palaoro et al. |
| 2004/0163456 A1* | 8/2004 | Saheki et al. ............... 73/146.8 |
| 2007/0186637 A1* | 8/2007 | Blossfeld .................... 73/146.8 |
| 2009/0229676 A1 | 9/2009 | Palaoro et al. |

FOREIGN PATENT DOCUMENTS

| | | | | |
|---|---|---|---|---|
| EP | 0751017 | 1/1997 | | |
| JP | 2007-015534 | 1/2007 | | |
| KR | 10200400012927 | 2/2004 | | |
| WO | 03002360 | 1/2003 | | |
| WO | 2008055944 | 5/2008 | | |
| WO | WO/2008/055944 | * 5/2008 | ............. | B60C 23/04 |
| WO | 2008064869 | 6/2008 | | |

OTHER PUBLICATIONS

Japanese Office action dated Oct. 1, 2013.
Korean Office action dated Aug. 9, 2013.

* cited by examiner

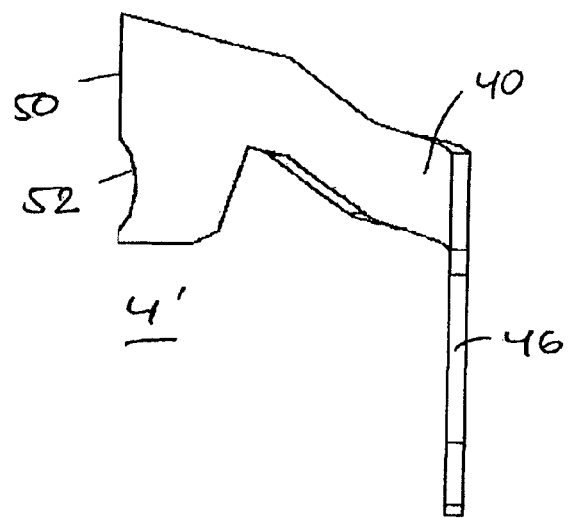
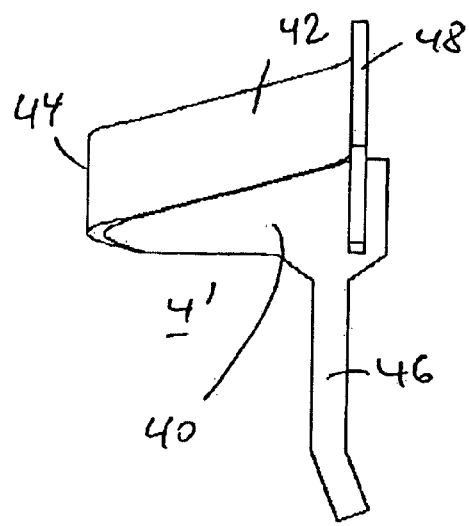
Fig. 10
Fig. 11
Fig. 12
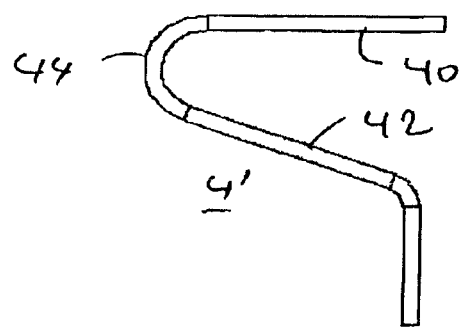

VALVE ARRANGEMENT

BACKGROUND OF THE INVENTION

The instant invention relates to a valve arrangement according to the preamble of the main claim. A valve device is known, for example, from EP 0 751 017 B1 by the applicant and deals with the topic of connecting the valve body of a valve to a housing, which is typically provided on a inner tire side and which is provided with electronic tire pressure measuring means for detecting the tire pressure and for transmitting a corresponding signal.

For this purpose, the device described in EP 0 751 017 B1 provides for the housing to be tensioned against the valve body from the direction of the inner tire side by means of a fixing screw. However, such an assembly has the disadvantage that—in a time-consuming manner—the fixing screw is guided through a housing segment of the housing and must engage with an internal thread of the valve body. Due to its dead weight, this fixing screw also has a disadvantageous effect on the dynamic behavior of the overall arrangement.

A valve device according to the preamble of the main claim is known from WO 2008/064869 A1. With regard to the further state of the art, reference is made to WO 3/00260 A1, DE 10 2006 043873 A1 as well as DE 10 2005 027002 A1.

Accordingly, it is the object of the instant invention to improve a known valve device in view of a releasable fastening between the valve body and the housing, in particular to adapt and to simplify the locking between these parts, thereby improving the constructive effort and the operation in response to the assembly.

SUMMARY OF THE INVENTION

The object is solved by means of the valve device comprising a retaining means.

The provision according to the invention of the retaining means, which engage laterally in a jacket-side locking segment of the valve body and for producing the locked state, initially has the advantageous effect according to the invention that a fixed locking between the valve body and the housing can be realized in a very simple constructive manner, while at the same time being releasable by means of a simple manual activation: the locking is ensured in a highly effective manner by fixing an axial relative position between valve body and housing in that the retaining means, typically further developed as suitable shaped element (for instance a piece of sheet metal, bent component, stamped part or piece of wire) engage laterally and only to a limited extent with the jacket-side locking segment in individual lateral segments and not along the entire periphery ("lateral" is to be understood in this manner in terms of the invention) (wherein the locking segment in turn can preferably be equipped as a slit or the like, which revolves in segments or completely). By simply moving, bending or other measures, which are required, for instance by manual access, the shaped element can be brought out of its engaged position (locked state) and can thus allow for the free movement and disengagement of the housing relative to the valve body. Vice versa, a latching or snap-in (for instance by means of suitable elastic or resilient embodiment of a corresponding area, which engages with the locking segment), can in turn take place in response to a suitable embodiment of the retaining means.

Accordingly, provision is made according to preferred developments of the invention for the retaining means to initially be designed as component assemblies, which are supported on or in the housing in a pivotable, rotatable, resilient and/or plastically deformable manner. The shaped element, which has already been mentioned, can thus be suitably adapted to the retaining purpose and can additionally be produced and assembled in a simple manner and with little effort.

In such a case of a retaining means, which is provided separately from the housing material, the further effect of the invention is visible in a particularly advantageous manner, namely that the retaining means are suitably retained or locked on or in the housing in the locked state, which takes place in a more preferable manner by means of the locked valve body itself. In other words, the accommodation or storage, respectively, of the retaining means (for instance shaped element) is provided according to this preferred type of realization of the invention such that the inserted and locked valve body itself prevents the retaining means from falling out or from being removed unintentionally, respectively.

The retaining means are designed in a further preferred manner according to the invention in a lever or bracket-like manner and encompass an arm or journal, which is designed for engaging in or on the locking segment, respectively.

According to a further preferred type of realization of the invention, these retaining means are realized as stamped metal part (more preferably in one piece). It is advantageous herein when a spring effect is realized by means of a U-shaped or V-shaped cross section of the retaining means, wherein two journals define a spring segment and one journal is supported on the housing (more preferably is attached at that location in a suitable manner, for instance by means of a groove or undercut), while the other journal then interacts with the valve so as to form a lock, if applicable by means of a segment fitting tightly thereon.

In addition, it is particularly preferred according to a development according to the invention, to provide for a segment of the retaining means for the housing-external access, for instance for the direct manual access or for the access by means of a suitable tool. Such a measure then makes it possible in a simple manner for the retaining means to be capable of being brought into the unlocked state (thus by deformation of a plastically deformable shaped body, e.g.), so that the housing can thereupon then be disengaged from the valve body.

In the alternative and in the context of the invention, provision is also made for a type of realization, in the case of which the retaining means are realized as a segment, which fits tightly on the housing in one piece, for further reducing the required components; provision is made here, for example, for embodying an arm or a similar projection, which fits tightly in one piece, such that it can interact with an assigned recess or a depression, respectively, at the jacket area of the valve body so as to form a lock.

According to a preferred type of realization and for providing for a cost-efficient aggregate, which is particularly suitable for high volume production, provision is made additionally to embody the valve body in one piece. For instance, contrary to the generic cited state of the art, it is not necessary to provide for an internal thread or a similar fastening means, thus resulting in larger constructive flexibility with reference to the valve body, so that the valve body can also be present in one piece according to the preferred development of the invention.

It is further preferred within the context of the invention to embody the valve body with means for anti-twist protecting such that a radial position of the valve body relative to the housing is determined. In the concrete realization, this can be carried out, for example, in that the valve body, for instance in the housing-side end area, embodies one or a plurality of planar surfaces, which interact for the non-positive interaction with a corresponding accommodating segment of the housing and for establishing the anti-twist protection.

It is furthermore particularly preferred in the context of the invention to embody the valve device as a so-called snap-in valve. For this purpose, the valve body (which is designed in one piece in a typical manner and according to the development) attains in the jacket area on the outer side, in the otherwise known manner, a coating (attached rubber body), which can snap into a corresponding rim hole under deformation of the rubber body and which can thus allow for a particularly simple assembly.

A further preferred development of the invention further makes it possible for a retaining means, which is realized from metallic material, to additionally and synergetically be capable of being fastened electrically (or in a high-frequency conducting manner, respectively) as an antenna, emitter or the like to a transmitting or receiving electronics, respectively, which is provided in the housing (and which then contacts the metallic valve body, if necessary): That is to say, in so doing, it is then possible in an advantageous manner to improve the high-frequency or radio characteristics, respectively, of known devices, which are provided in the housing, while using the (already available) retaining means, which are suitably provided as metal sheet or wire element.

It is particularly preferred herein, for further simplifying the production, to provide the retaining means (typically realized as suitably bent stamped part) with a connecting or contact segment in the form of a contact flange, respectively, (more preferably fitting closely in one piece) or another appendage, which is dimensioned such that it can be inserted directly into a printed circuit board of a transmitting or receiving electronics, respectively, and that it can be soldered to other electronic components at that location.

As a result, the instant invention provides for the flexibilization and simplification of known locking or fastening technologies, respectively, between a valve body and a housing (typically designed for accommodating a pressure sensor as well as a high-frequency component) in a surprisingly simple and elegant manner, wherein the invention is particularly suitable for realizing a snap-in valve; however, the application is not limited to this on principle.

BRIEF DESCRIPTION OF THE DRAWINGS

Further advantages, features and details of the invention result from the following description of preferred exemplary embodiments as well as by means of the figures.

FIG. 6 shows a schematic view analogous to the illustration of FIG. 1 of a valve device according to a second preferred embodiment including a sectional enlargement in FIG. 6a;

FIG. 10 to FIG. 13 show different views of the retaining element, which is realized in one piece as a bent stamped part, for realizing the retaining means of the second exemplary embodiment

DETAILED DESCRIPTION

Figure 1:
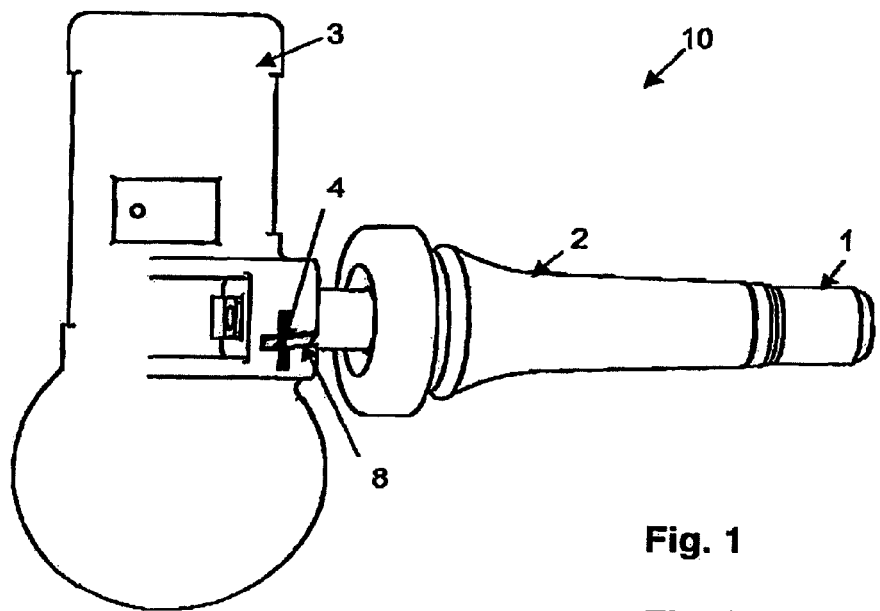
FIG. 1 shows a schematic view of an assembled component of a valve device in top view.
Figure 2:
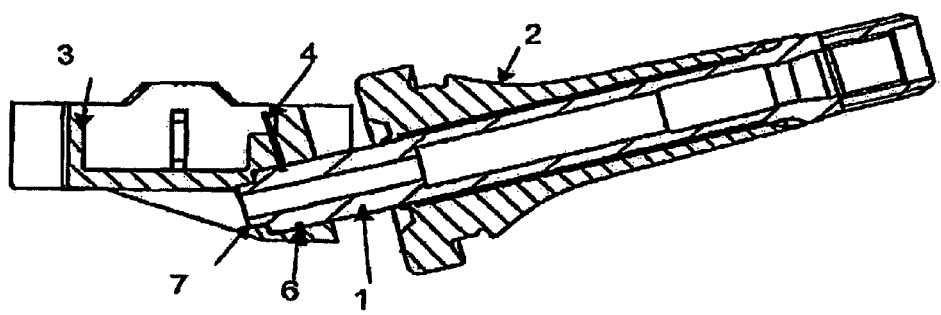
FIG. 2 shows a longitudinal section in axial direction through the arrangement of FIG. 1.
Figure 3:
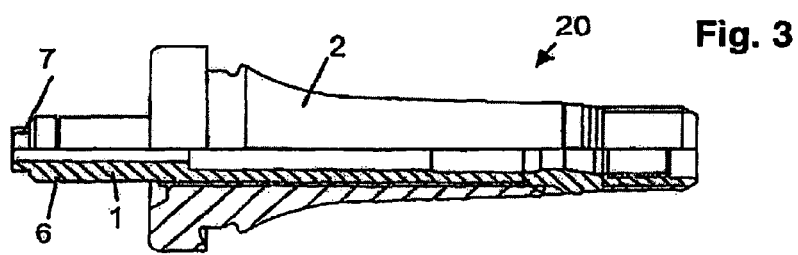
FIG. 3 shows a detailed view of the valve body 20 (in one piece) comprising a surrounding rubber body for realizing the snap-in valve.
Figure 4:
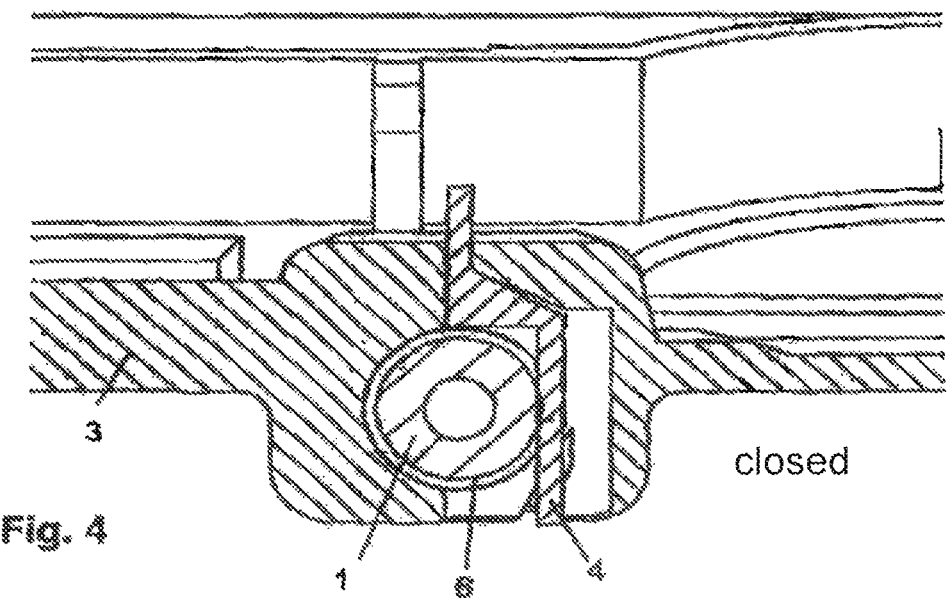
FIG. 4, FIG. 5 show cross sectional views through the arrangement of FIG. 1, FIG. 2 in the area of the engaging retaining element (retaining means) for clarifying the locked state (FIG. 4) or of the unlocked, opened state, respectively (FIG. 5)
Figure 5:
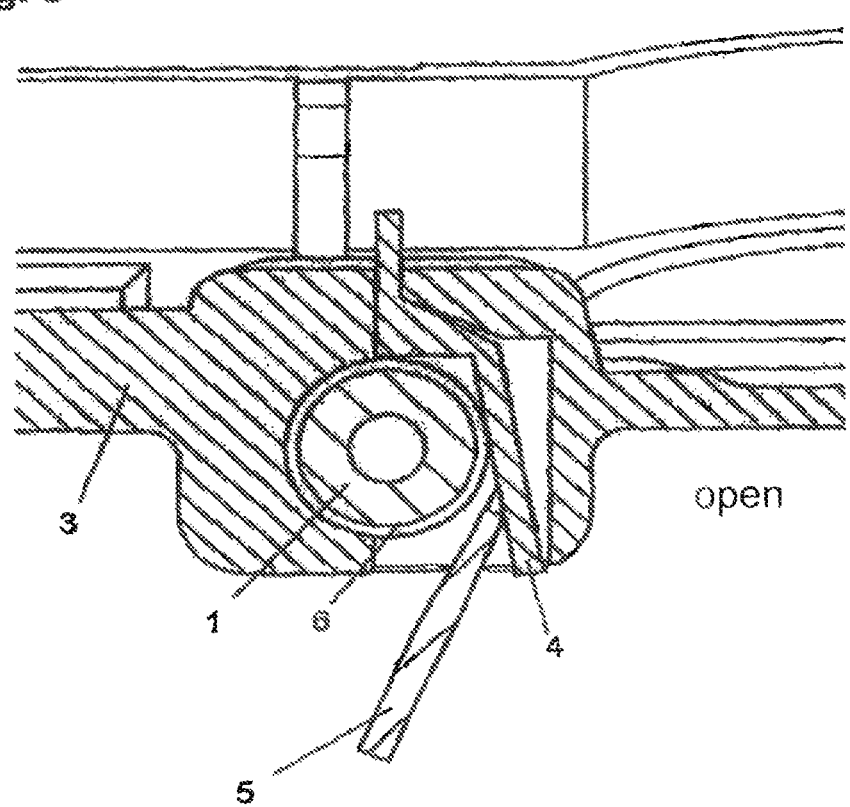

The types of realization of valve arrangement 10 shown in FIGS. 1 to 5 clarify that neither a screw connection is necessary for retaining the valve body on the housing (or for retaining the housing on the valve body, respectively), nor a separate retaining element, a retaining ring or the like must be attached. Instead, as is clarified in FIGS. 4 and 5 as cross section, only a shaped or retaining element 4, which is accommodated in the housing so as to be capable of being deformed or pivoted, is moved as a stamped part by external engagement through a lower housing opening 8 between a lateral engagement position (FIG. 4, the elongate arm of the retaining element, which is oriented downwards, engages with a revolving annular groove 6 of the valve body 1) and an unlocked state (FIG. 5, illustrating the tool 5 for unlocking, which reaches through the opening). More accurately, the retaining element 4 is fixedly accommodated as bracket-shaped element in the upper area and is designed in a resilient manner, so that the elongate arm can be moved out of its engagement area (FIG. 5) under the effect of the tool 5 and the valve body or the housing, respectively, can thus be moved in axial direction for removal (that is, out of the image plane of FIG. 4, FIG. 5). It is clarified at the same time that the retaining element 4 is secured against falling out under the effect of the inserted valve body; in other words, it can remain in its position and can be activated as indicated.

According to a preferred embodiment, the valve body is formed such that it bends the retaining element or the arm, respectively, outwardly in response to being plugged in (e.g. against an elastic or spring effect). A jacket-side annular groove, which is provided on the valve body, is then dimensioned appropriately for interacting with the shaped element and can establish a snap-in connection.

The figures additionally show an anti-twist protection device, which is realized by means of an end-side embodiment of one or a plurality of planar surfaces 7 of the valve body and a corresponding accommodation in the housing. An electric coupling of the retaining element 4 to a sensor and transmitting electronics for transmitting a detected internal tire pressure measuring value provided in the interior of the housing of the electronic housing 3 (e.g. FIG. 2) is further not shown in detail. Through this, not only an additional antenna or resonator function, respectively, is then available in the form of the retaining element 4, this can even ensure that the metallic valve body itself acts as antenna or emitter element and that a very simple radio transmission can thus also take place towards the outside (externally of a rim) in response to a corresponding electric coupling to the valve body.

In an otherwise known manner, the snap-in valve is inserted into a rim by using the elastic effect of the rubber body 2. As is shown in FIG. 4 or 5, respectively, a snap-in between the retaining element 4 and the valve body is released, if necessary, by access by means of a tool 5 so as to be able to remove the electronic housing from the valve body in axial direction in this respect.

With reference to FIGS. 6 to 14, a second embodiment of the valve arrangement 10' of the instant invention is described below. With reference to the claimed solution principle, this type of realization of the valve device as well as the constructive realization corresponds, for the most part, to the first embodiment, which is described by means of FIGS. 1 to 5, wherein the subsequent description of the second embodiment concentrates on the differences to the first embodiment and identical reference numerals are used for identical component assemblies. Where components or component assemblies, respectively, which are functionally equivalent, yet slightly different in detail or in the constructive realization, respectively, this is clarified by means of apostrophized reference numerals.

Analogous to the discussion of the first exemplary embodiment by means of FIGS. 1, 2, FIGS. 6, 6a, 7, 7a clarify a second type of realization of the invention in the schematic top view or in the form of a longitudinal section: for realizing the retaining means according to the invention, the retaining element (see the details views of FIGS. 10 to 13) consists herein of a resilient bracket element 4', which is realized in one piece from a metal sheet and which encompasses a pair of journals 40, 42 (FIG. 10 to FIG. 13), which are connected in cross section in a V-shaped manner (FIG. 12) via a resilient segment 44. An elongate contact segment 46, which is designed (see FIG. 13) for interacting with an electronic circuit board, which is not illustrated in detail, for the transmitting or receiving functionality, is connected to the journal 40 in one piece such that one end of the segment 46 is soldered to this printed circuit board in an otherwise known manner and such that the resilient bracket 4' can thus act as antenna for this high-frequency unit. As is furthermore clarified in FIG. 6a or 7a, respectively (as detailed enlargements of the segments of FIG. 6 of FIG. 7, respectively, which are illustrated by means of dashed lines), the journal 40 is accommodated in a groove 6' of the housing 3' and is held by it.

An engagement segment 48 of the bent retaining element sheet, which offers an engagement edge 50 (see FIG. 10) for engaging with a groove (depression) 6' of the valve body 1', extends from the journal 42; for better locking, this edge has a profile 52, which is designed so as to be bent slightly inwards in a curved manner.

Figures 6, 6A:
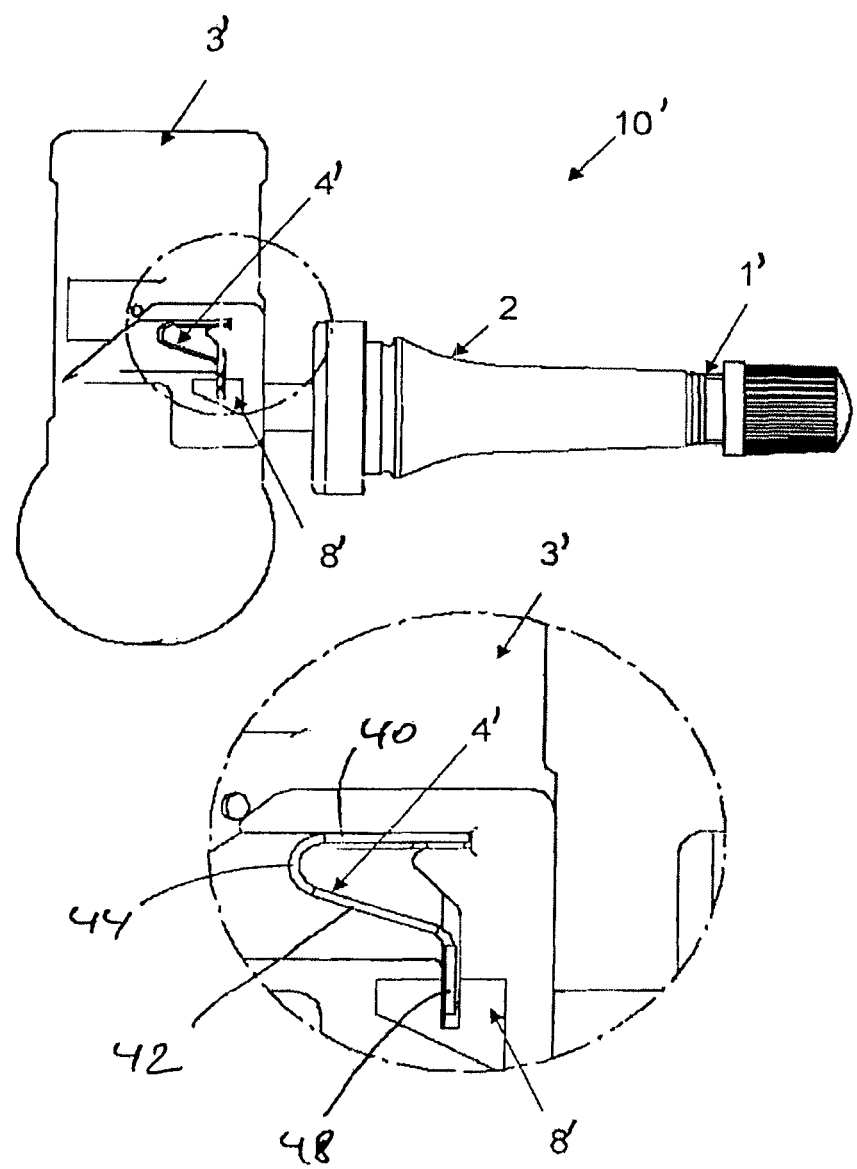
Figures 7, 7A:
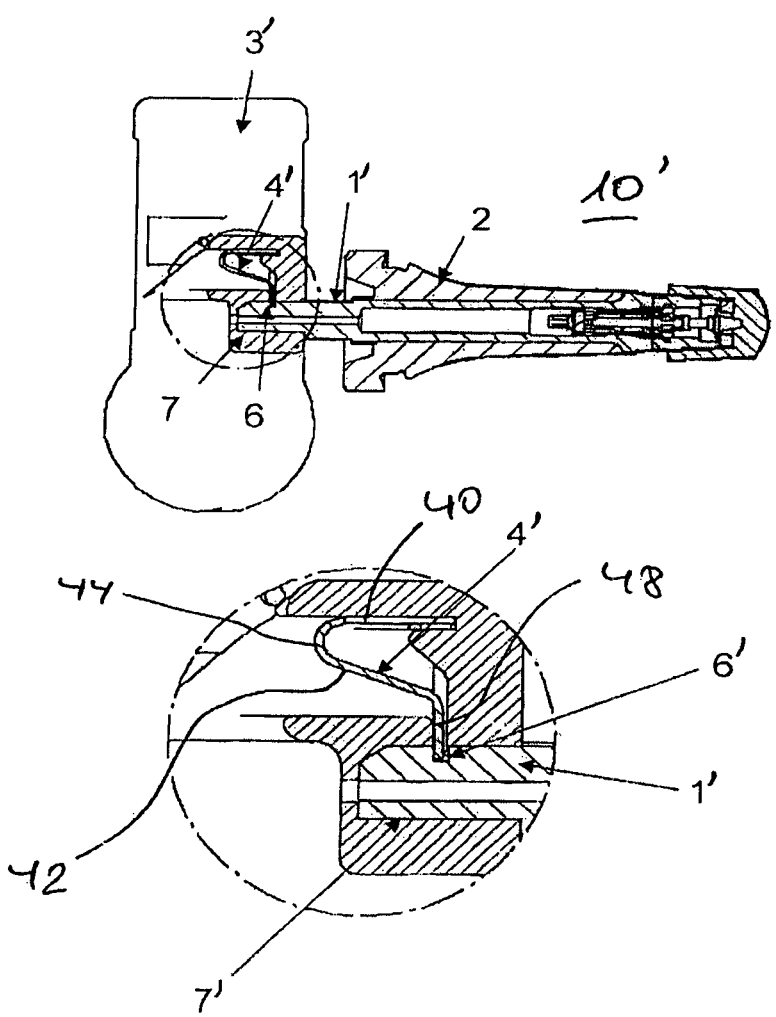
FIG. 7 shows an illustration analogous to FIG. 2 of the second embodiment (FIG. 6) as longitudinal section in axial direction, wherein the sectional illustration in FIG. 7a from FIG. 7 clarifies details of the locking.
Figure 8:
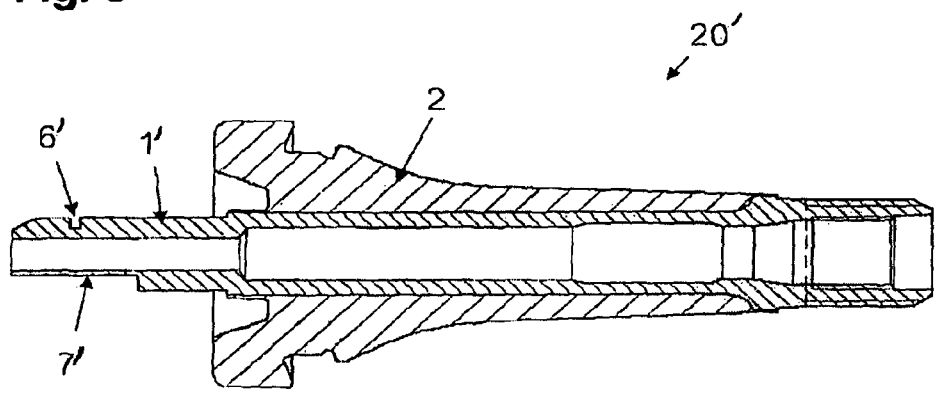
FIG. 8 shows a detailed view of the modified valve body 20' analogous to the illustration of FIG. 3 for the exemplary embodiment of FIG. 6, 7.
Figure 9:
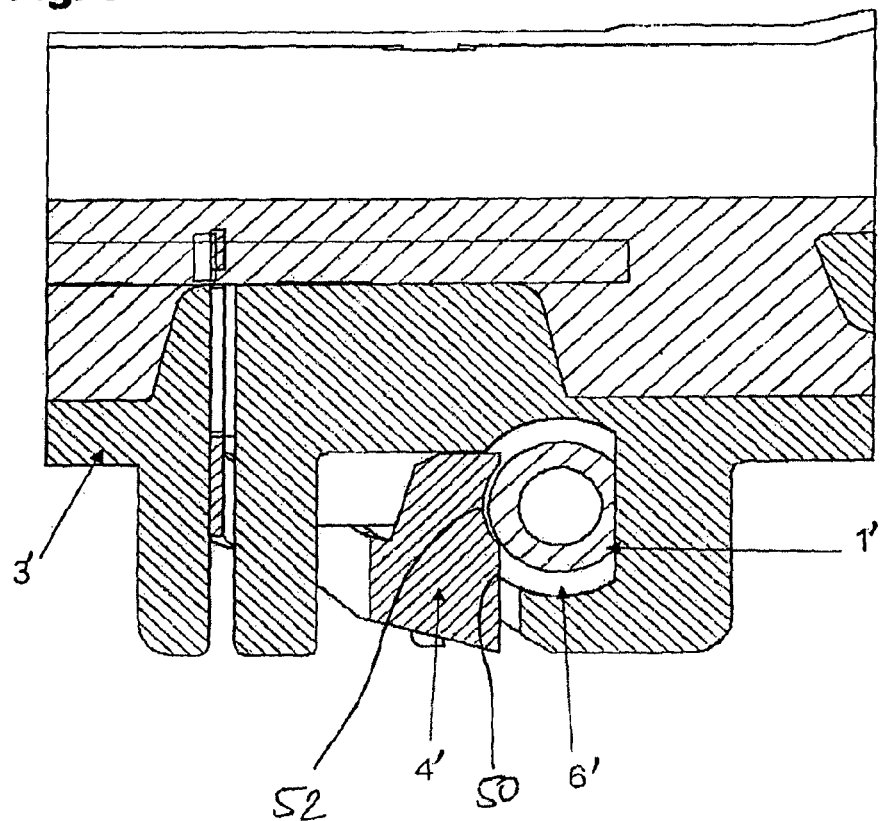
FIG. 9 shows a detailed view analogous to the illustration of FIG. 4 for clarifying the snap-in or the locking, respectively, of the valve body by means of the retaining element in the exemplary embodiment of FIGS. 6 to 8.
Figure 13:
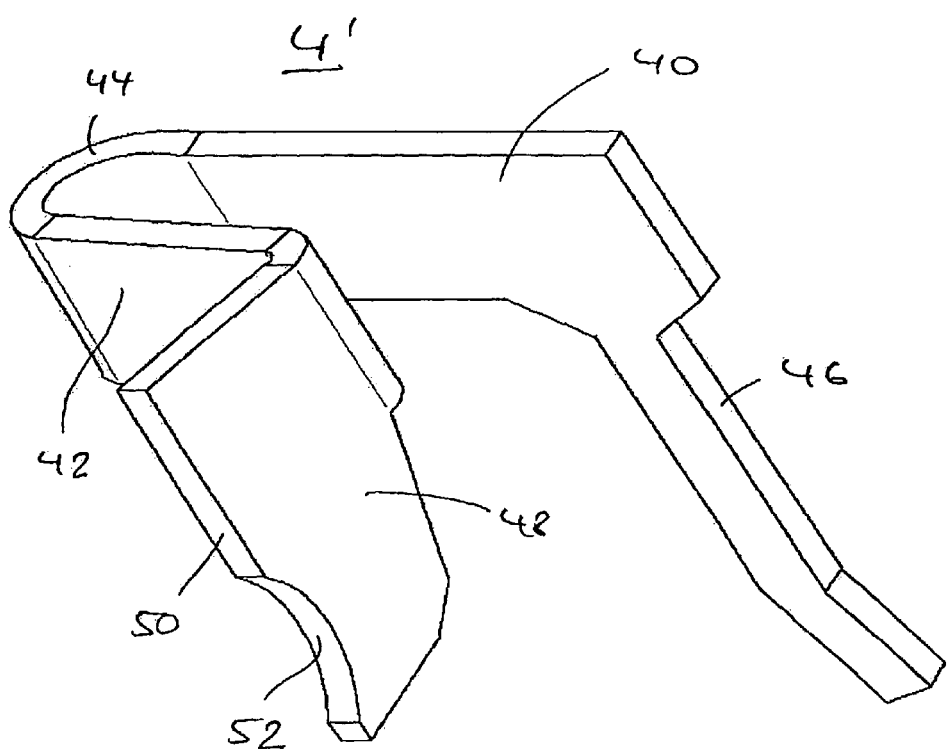
Figure 14:
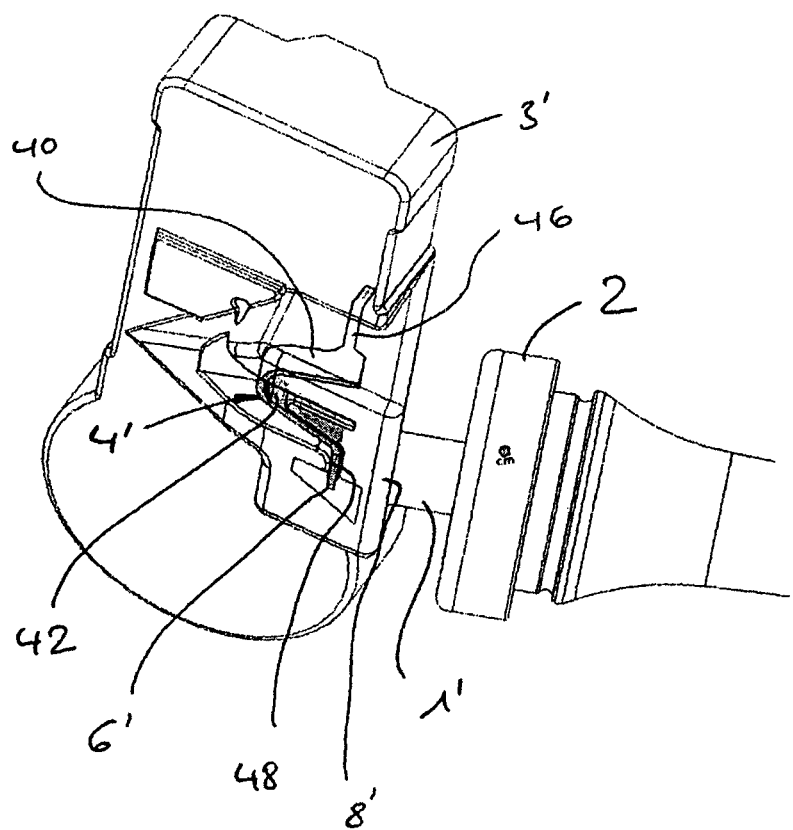
FIG. 14 shows a perspective view for clarifying the interaction of the components of the valve device of the second exemplary embodiment.

FIGS. 6, 6, 7, 7a as well as 14 clarify the snapped-in state. Analogous to the afore-described first exemplary embodiment, the metallic valve body 1' engages (in response to the insertion with its conical front end segment) with the groove 6' (see also the cross section of FIG. 8). In addition, a flat area 7' at the valve body 1 ensures an anti-twist protection in interaction with a correspondingly designed accommodation in the housing (e.g. FIG. 7a).

Analogous to the afore-described manner, the release takes place by engagement with the housing depression or opening 8', respectively, for instance by means of a screw driver or the like, whereby the engagement edge 50 disengages from the groove 6' at the segment 48 and the valve can thus be removed.

In the case of the second embodiment, the suspension, which is formed by the bracket shape consisting of journals 40, 42 as well as of the resilient segment 44 in the direction towards the valve body, which combines high locking safety with easy assembly and reliability, is particularly preferred.

The instant invention is not limited to the illustrated exemplary embodiments; in particular, it is comprised and provided by the invention to produce and use the shaped element in different suitable manners. It can thereby be realized as a plastic part as well as as an elastically deformable part. It can furthermore be provided in one piece on the housing or can be designed in a different manner for fulfilling its locking effect according to the invention.

The invention claimed is:

1. A valve device comprising a valve body (1, 1'), which is releasably connected by a retaining unit (4, 4') to a housing (3, 3') for receiving electronic tire pressure measuring means so that, in a locked state of the retaining unit, the valve body is fixed relative to the housing and, in an unlocked state, the valve body can be displaced in an axial extension direction relative to the housing and released therefrom, wherein the retaining unit is provided on or in the housing so that it engages laterally on or in a jacket-side locking segment of the valve body and establishes the locked state, and the retaining unit is retained or locked on or in the housing in the locked state, wherein the retaining unit embodies a snap-in connection with the locking segment in the locked state and the valve body is formed such that it bends the retaining unit outwardly in response to being plugged into the housing, wherein the locking segment comprises a jacket-side recess on the valve body and dimensioned for interacting with the retaining unit to establish the snap-in connection and wherein the retaining unit comprises a lever having an arm which extends transversely to the valve body and is radially pivotable relative to the valve body between the locked state wherein the arm engages the jacket-side recess and the unlocked state wherein the arm is removed from the jacket-side recess.

2. The device according to claim 1, wherein the retaining unit is a component assembly, which is supported on or in the housing in a pivotable, rotatable, resilient and/or plastically deformable manner.

3. The device according to claim 1, wherein the retaining unit is accessible in a housing-external manner, and operatable manually and/or by a tool for disengaging the locked state.

4. The device according to claim 1, wherein the retaining unit comprises a deformable body which, when subjected to a plastic deformation disengages the locked state.

5. The device according to claim 1, wherein the retaining unit is a one-piece segment which fits into corresponding structure of the housing.

6. The device according to claim 1, wherein the retaining unit is separate from the housing and supported such that it is held on or in the housing and/or is locked in the locked state by the valve body.

7. The device according to claim 1, wherein the retaining unit is designed in one piece and comprises a spring segment (44) as well as two journals in a U- or V-shaped cross sectional shape, one journal (40) of which is supported on the housing.

8. The device according to claim 7, wherein the one journal (40) engages with a groove or an undercut of the housing for attaching the retaining unit to the housing.

9. The device according to claim 8, wherein the valve body is designed in one piece.

10. The device according to claim 9, wherein the valve body and housing have corresponding planar surfaces for preventing twist of the valve body relative to the housing.

11. The device according to claim 10, wherein the valve device is a snap-in valve.

12. The device according to claim 1, wherein the retaining unit comprises a metallic retaining unit connected electrically and/or in a high-frequency manner to transmitting and/or receiving electronics, which is provided in the housing.

13. The device according to claim 12, wherein the retaining unit (4') is designed in one piece as a stamped part, comprises a contact segment (46) designed for interacting with a printed circuit board, which supports transmitting or receiving electronics, respectively.

14. The device according to claim 1, wherein the retaining unit is in the housing.

\* \* \* \* \*